(12) United States Patent
Hagestad et al.

(10) Patent No.: US 10,191,243 B2
(45) Date of Patent: Jan. 29, 2019

(54) EXPANDABLE MIRRORS

(71) Applicant: Ford Global Technologies, LLC, Dearborn, MI (US)

(72) Inventors: Leigh Gray Hagestad, East Palo Alto, CA (US); John Michael Galan Ferrer, Carson, CA (US); Victoria Leigh Schein, Palo Alto, CA (US); Nitin Bandaru, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/146,739

(22) Filed: May 4, 2016

(65) Prior Publication Data

US 2017/0322389 A1  Nov. 9, 2017

(51) Int. Cl.
| | |
|---|---|
| *B60R 1/04* | (2006.01) |
| *G02B 7/182* | (2006.01) |
| *G02B 1/11* | (2015.01) |
| *B60R 11/00* | (2006.01) |
| *B60J 3/02* | (2006.01) |
| *B60R 1/12* | (2006.01) |

(52) U.S. Cl.
CPC .......... *G02B 7/1821* (2013.01); *B60J 3/0204* (2013.01); *B60R 1/04* (2013.01); *B60R 1/12* (2013.01); *B60R 1/1207* (2013.01); *B60R 11/00* (2013.01); *G02B 1/11* (2013.01); *B60R 2001/1238* (2013.01); *B60R 2001/1269* (2013.01); *B60R 2001/1284* (2013.01); *B60R 2011/0035* (2013.01); *B60R 2011/0082* (2013.01)

(58) Field of Classification Search
CPC ........... B60R 1/04; B60R 1/12; B60R 1/1207; B60R 2001/1238; B60R 2001/1269; B60R 2001/1284
USPC ............... 359/841, 850, 854, 855, 865, 877; 362/136, 142, 137; 296/97.5, 97.8, 1.11
See application file for complete search history.

(56) References Cited

U.S. PATENT DOCUMENTS

| | | | |
|---|---|---|---|
| 365,183 A | * | 6/1887 | Hufeland ................ B60R 1/081 359/854 |
| 2,547,101 A | | 4/1951 | Uttz |

(Continued)

FOREIGN PATENT DOCUMENTS

DE         10118432 A1    10/2002

*Primary Examiner* — Ricky D Shafer
(74) *Attorney, Agent, or Firm* — David R. Stevens; Stevens Law Group

(57) ABSTRACT

Various expandable mirrors and a vehicle having the same are described. An expandable mirror may include a first pane having a first reflective surface and a second pane having a second reflective surface. The expandable mirror may also include a mechanism connected with each of the first and second panes. The mechanism may be actuated to expand a viewing area of the mirror such that the expanded viewing area includes both the first and second reflective surfaces. The expandable mirror may also include a third pane having a third reflective surface that contributes to the viewing area when the mirror is expanded. The expandable mirror may also include a manual button configured to actuate or de-actuate the mechanism when pressed. The expandable mirror may also include a positioning motor configured to adjust the orientation of the viewing area of the mirror.

15 Claims, 10 Drawing Sheets

(56) References Cited

U.S. PATENT DOCUMENTS

| | | | | |
|---|---|---|---|---|
| 3,145,257 A | * | 8/1964 | Suga | B60R 1/025 |
| | | | | 359/854 |
| 3,371,955 A | * | 3/1968 | Herrington, Sr. | B60J 3/0208 |
| | | | | 296/97.8 |
| 3,588,233 A | | 6/1971 | Lambert | |
| 4,624,499 A | | 11/1986 | Flowerday | |
| 4,681,366 A | * | 7/1987 | Lobanoff | B60N 2/4876 |
| | | | | 248/475.1 |
| 5,124,847 A | * | 6/1992 | Gong | B60R 1/081 |
| | | | | 359/854 |
| 5,206,764 A | | 4/1993 | Lamoglia | |
| 6,585,384 B2 | * | 7/2003 | Nielsen | B60R 1/008 |
| | | | | 359/838 |
| 6,926,416 B2 | | 8/2005 | Sawyer | |
| 7,001,029 B1 | * | 2/2006 | Lagana | B60R 1/081 |
| | | | | 296/97.8 |
| 8,550,531 B1 | * | 10/2013 | Fancher, III | B60J 3/0208 |
| | | | | 296/97.1 |
| 9,421,911 B2 | * | 8/2016 | Favila | B60R 1/04 |
| 2006/0050018 A1 | * | 3/2006 | Hutzel | B60K 35/00 |
| | | | | 345/60 |

* cited by examiner

EXPANDABLE MIRRORS

TECHNICAL FIELD

The present disclosure generally relates to mirrors and, more particularly, to expandable mirrors inside a manned transportation vehicle such as an automobile.

BACKGROUND

Automobiles or other vehicles are indispensable in contemporary living. People spend significant amount of time in various kinds of transportation vehicles either as drivers or passengers. A passenger may choose to make use of the time riding in a vehicle to do a variety of activities, including personal vanity actions that may require a mirror. A driver may choose, after arriving at a destination, to use the vehicle as a staging area to groom himself or herself in preparation for a subsequent event taking place at the destination, in which case a mirror may also be needed.

Mirrors commonly provided in the cabin of a transportation vehicle has long served as a passable accessory for serving the purpose of personal use. For example, accessory mirrors are often provided on the inner side of sun visors above either or both of the driver seat and the front passenger seat of an automobile. These mirrors, however, are often small in size, poorly lit, oddly angled as they are disposed, and limited in the capability of adjustment of the orientation of the viewing surface, all making it difficult for the users to see themselves holistically in the mirrors and/or gaining the benefits of using the mirrors effectively. Moreover, in using such a mirror, a user is often required to position himself/herself awkwardly within the limited space of the vehicle cabin by stretching his/her body, sitting up past his/her height or otherwise turning himself/herself at an uncomfortable angle with respect to the mirror. These inconveniences and limitations have largely reduced the feasibility and effectiveness of the mirrors.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The present disclosure aims to overcome the disadvantages, limitations and inconveniences, as mentioned above, of existing accessory mirrors commonly provided in contemporary transportation vehicles. Specifically, the present disclosure aims to provide a mirror implementable in a vehicle that exhibits a larger viewing area that is properly lit and oriented such that a user can use the mirror effectively and conveniently, while maintaining the improved mirror in a similar form factor as those of the existing accessory mirrors when it is not in use.

Figure 1:
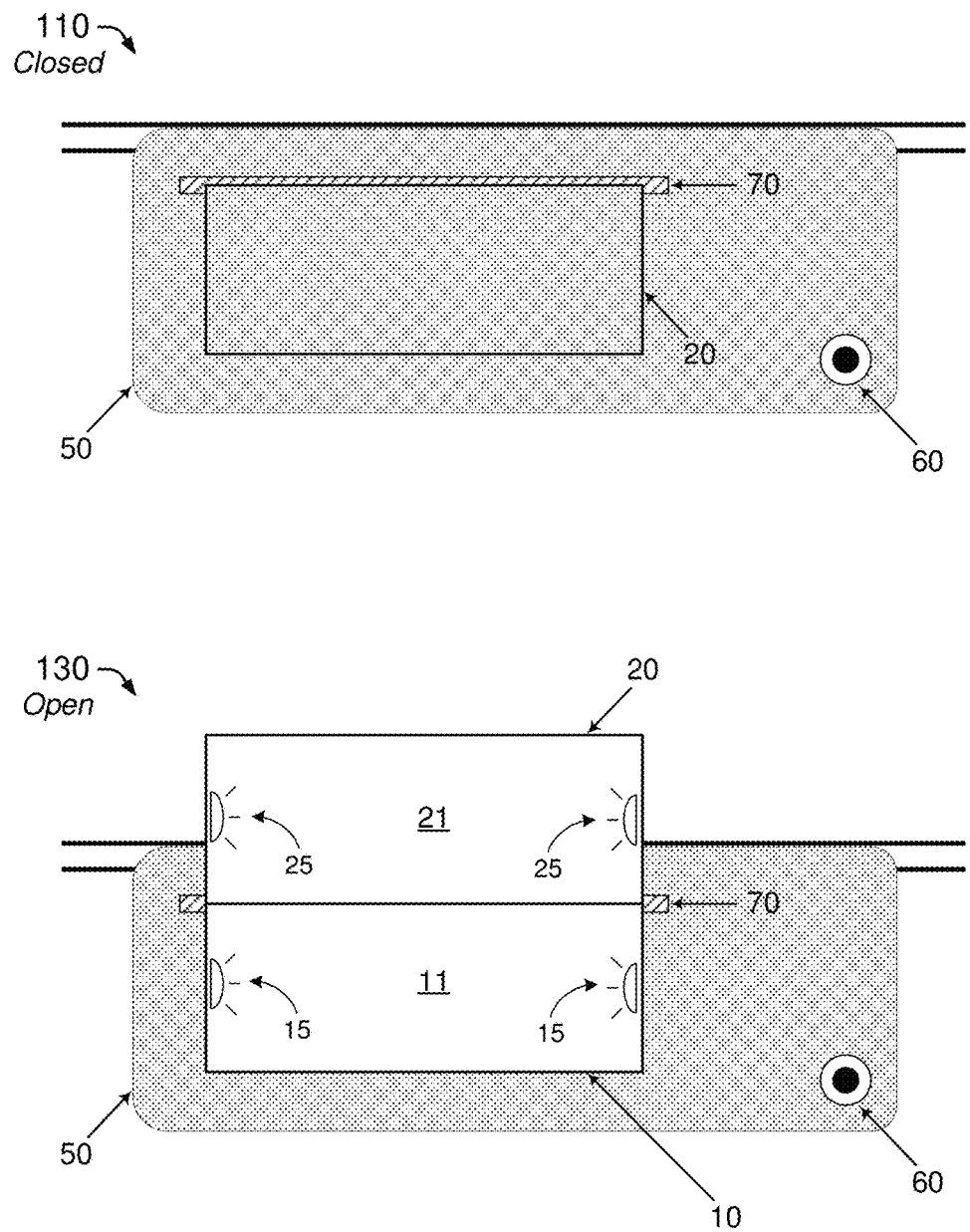
FIG. 1 is a diagram depicting an example expandable mirror in accordance with an embodiment of the present disclosure.

FIG. 1 illustrates an example expandable mirror that may be implementable in a vehicle. The mirror may include first pane 10 and second pane 20. The mirror may further include mechanism 70 that connects first pane 10 and second pane 20 on one side of each of first pane 10 and second pane 20 (e.g., the upper side as shown in FIG. 1, which is the side closer to the ceiling of a cabin of a vehicle). First pane 10 may have reflective surface 11 that may constitute a portion of a viewing area of the mirror, while second pane 20 may have reflective surface 21 that may also constitute a portion of the viewing area of the mirror. First pane 10, second pane 20 and mechanism 70 may collectively be disposed on sun visor 50 located in a cabin of the vehicle. The expandable mirror of FIG. 1 may further include a manual button 60 via which a user can operate the mirror to open and/or to close. For instance, when manual button 60 is pressed and held, mechanism 70 may be actuated to open or otherwise expand the mirror; and when manual button 60 is subsequently released, mechanism 70 may be de-actuated to close or otherwise retract the expandable mirror.

Each of reflective surface 11 of first pane 10 and reflective surface 21 of second pane 20 may include a standard glass, an anti-glare glass, or a layer of reflective coating, so as to generate mirrored or otherwise reflected image of object(s) of interest. Mechanism 70 may include one or more mechanical hinges that may be, for example and not limited to, a friction hinge, a spring-loaded hinge, a motorized hinge or a combination thereof.

When the mirror of FIG. 1 is in closed position 110, second pane 20 may be disposed on top of first pane 10, with reflective surface 11 of first pane 10 and reflective surface 21 of second pane 20 facing one another such that neither of reflective surfaces 11 and 21 is exposed. That is, the viewing area of the mirror has zero size when the expandable mirror of FIG. 1 is in closed position 110. Furthermore, both first pane 10 and second pane 20 may be disposed flat against the inner surface of visor 50 when the mirror is in closed position 110, with first pane 10 sandwiched between, and laying in parallel with, visor 50 and second pane 20.

To place the mirror of FIG. 1 in open position 130, mechanism 70 may be actuated by the user via manual button 60 such that second pane 20 may swivel upwards and around mechanism 70 to expose reflective surfaces 11 and 21, which collectively form the viewing area of the expandable mirror. As such, the size of the viewing area of the mirror is essentially doubled as compared to a conventional accessory mirror, provided that reflective surfaces 11 and 21 have approximately or substantially the same size, although this is not a requirement. Either or both of first pane 10 or second pane 20 may include one or more lighting fixtures (such as lighting fixtures 15 and 25 shown in FIG. 1) configured to provide, or assist in providing, proper lighting of object(s) of interests to be mirrored.

Figure 2:
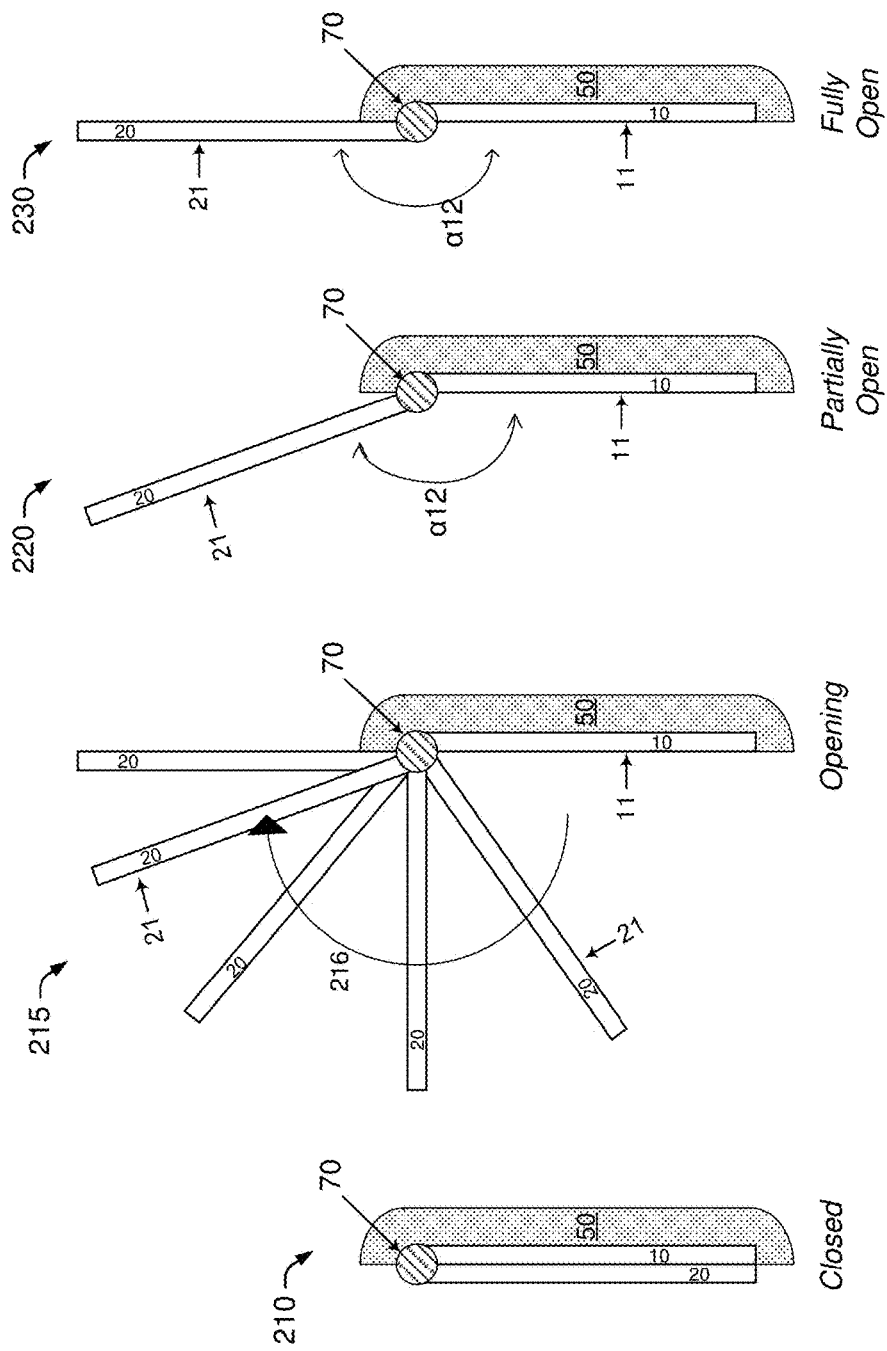
FIG. 2 is a diagram depicting an example expanding motion of an expandable mirror in accordance with an embodiment of the present disclosure.

FIG. 2 illustrates side views the expandable mirror of FIG. 1 for showing how the viewing area of the mirror is expanded. When the mirror is in closed position 210 that corresponds to closed position 110 of FIG. 1, first pane 10, second pane 20 and visor 50 may lay flat against, and in parallel with, each other, with first pane 10 sandwiched between visor 50 and second pane 20. In some embodiments, first pane 10 may be embedded in a recess formed on the inner side of visor 50. Reflective surface 11 of first pane 10 and reflective surface 21 of second pane 20 may thus face one another, and neither reflective surface may be exposed, when the mirror is in closed position 210.

When the mirror is in the process of opening 215, mechanism 70 may be actuated by a user via manual button 60 such that second pane 20 may rotate upwards around hinge 70 in swiveling motion 216, exposing reflective surfaces 11 and 21, while first pane 10 remains at the same position as in closed position 110 or 210. Similar to the mirror of FIG. 1, reflective surfaces 11 and 21 of the mirror of FIG. 2 collectively form the viewing area of the mirror for a user to use, regardless whether the mirror of FIG. 2 is placed in partially open position 220 or fully open position 230. Second pane 20 may be clamped or otherwise maintained by mechanism 70 at partially open position 220 (e.g., when mechanism 70 includes a friction hinge that may be configured to apply friction to second pane 20) when the mirror is in use. Alternatively, the mirror may be used with second pane 20 swiveling all the way until it cannot rotate further around mechanism 70, thereby placing the mirror in fully open position 230. As such, the mirror may adapt to specific needs of a user by providing a viewing area with angle α12 formed between first reflective surface 11 and second reflective surface 21 being less than or substantially equal to 180 degrees. It is worth noting that, although a maximum of angle α12 may appear in FIG. 2 to be substantially equal to 180 degrees, in some embodiments second pane 20 may be configured to swivel further such that angle α12 may be greater than 180 degrees.

Figure 3:
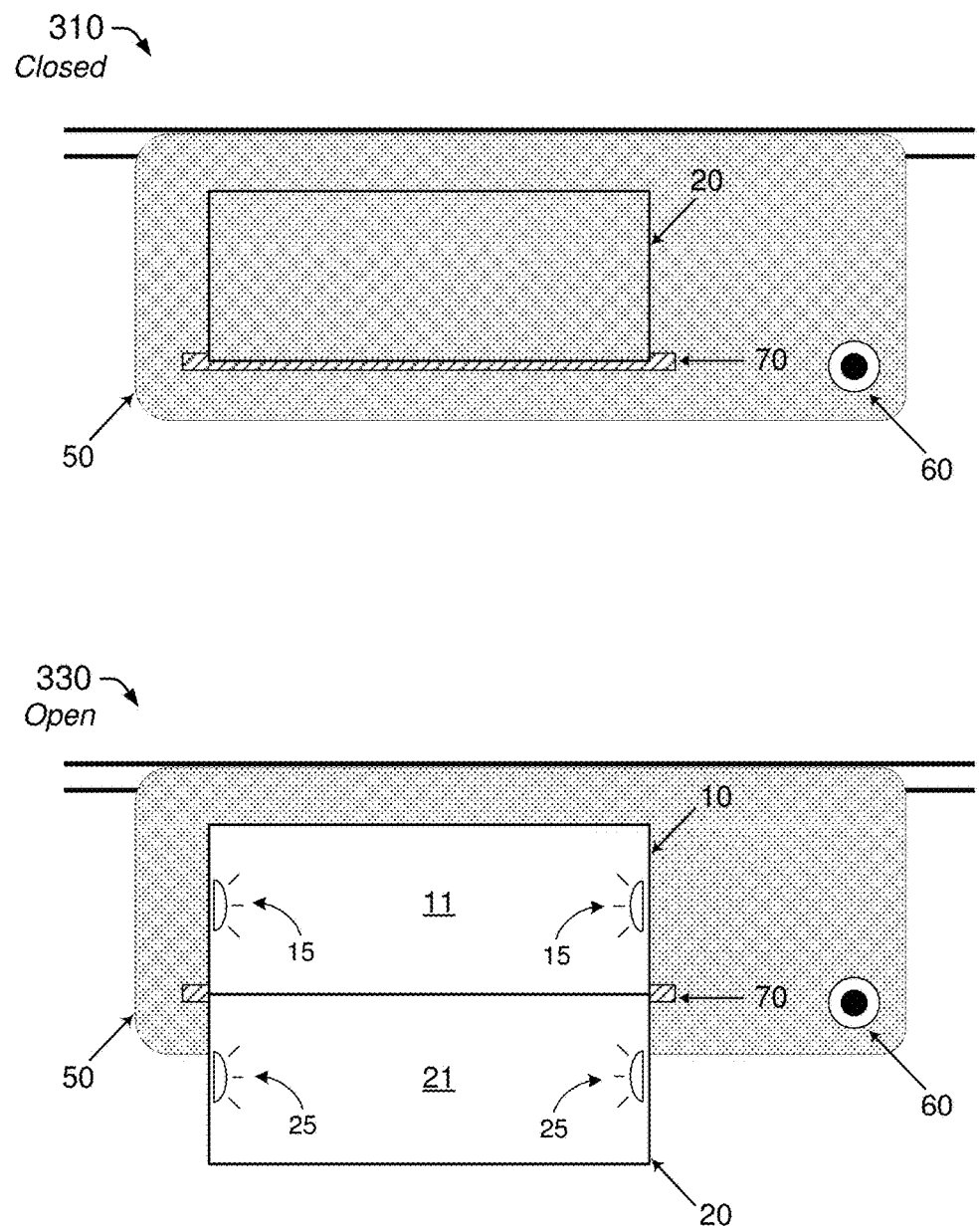
FIG. 3 is a diagram depicting another example expandable mirror in accordance with an embodiment of the present disclosure.

Alternative to the expandable mirror of FIG. 2, FIG. 3 illustrates an expandable mirror that may have its mechanism 70 located on the opposite (that is, lower) side of first pane 10 and second pane 20, as shown in closed position 310. When in open position 330, the expandable mirror of FIG. 3 may provide a viewing area at a lower location with respect to visor 50 than the viewing area provided by the expandable mirror of FIG. 1 in open position 130.

Figure 4:
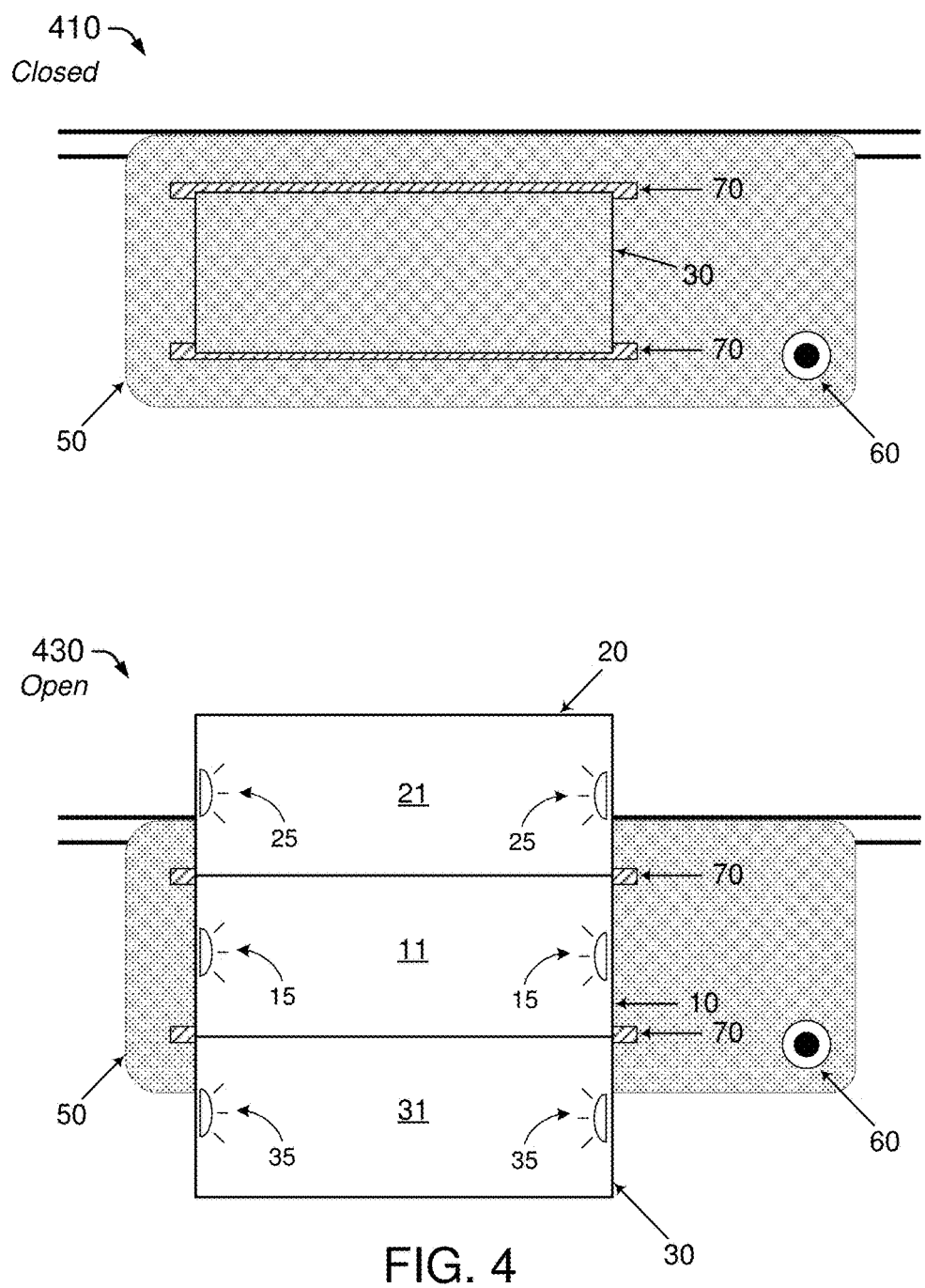
FIG. 4 is a diagram depicting yet another example expandable mirror in accordance with an embodiment of the present disclosure.
Figure 5:
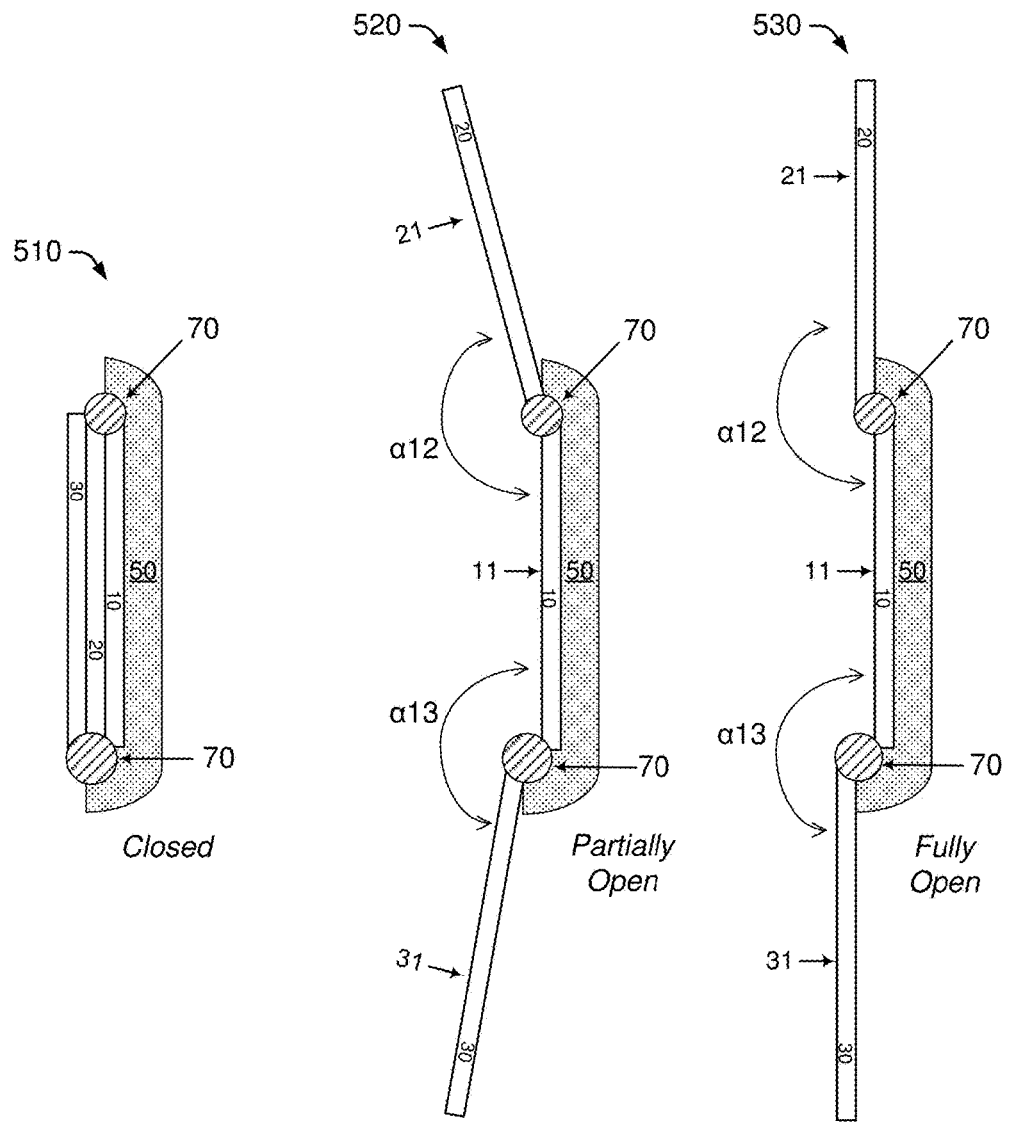
FIG. 5 is a diagram depicting another example expanding motion of an expandable mirror in accordance with an embodiment of the present disclosure.

Furthermore, an expandable mirror in accordance with the present disclosure may include an additional mirror pane to further expand the viewing area. As shown in FIGS. 4 and 5, an expandable mirror may include third pane 30 having third reflective surface 31. In addition, mechanism 70 of the mirror of FIG. 3 may include two rows of hinges instead of one row as in FIG. 1 and FIG. 2, with one row of hinge(s) located on the upper side connecting first pane 10 and second pane 20 and another row of hinge(s) on the lower side connecting first pane 10 and third pane 30. Third pane 30 may also be provided with one or more lighting fixtures 35 similar to the one or more lighting fixtures 15 of first pane 10 and the one or more lighting fixtures 25 of second pane 20, respectively.

When the mirror of FIGS. 4 and 5 is in closed position 410 or 510, mirror panes 10, 20 and 30 and visor 50 may lay in parallel with each other in a stack, with third pane 30 disposed on top of second pane 20, second pane 20 on top of first pane 10, and first pane 10 on top of visor 50. In some embodiments, first pane 10 may be embedded in a recess formed on the inner side of visor 50. Reflective surface 11 of first pane 10 and reflective surface 21 of second pane 20 may face one another, while reflective surface 31 of third pane 30 may also face reflective surface 11 of first pane 10, with second pane 20 sandwiched between third pane 30 and first pane 10.

To place the mirror of FIGS. 4 and 5 in open position 430, 520 or 530, mechanism 70 may be actuated by a user via manual button 60 such that third pane 30 may swivel downwards and around a hinge of mechanism 70 on the lower side of the panes to expose reflective surface 31. Similarly, second pane 20 may swivel upwards and around another hinge of mechanism 70 on the upper side of the panes to expose reflective surfaces 11 and 21. Thus, in open position 430, 520 or 530 reflective surfaces 11, 21 and 31 are all exposed, and collectively form the viewing area of the expandable mirror. As such, the size of the viewing area of the mirror is essentially tripled as compared to a conventional accessory mirror, provided that reflective surfaces 11, 21 and 31 have approximately or substantially the same size, although this is not a requirement. Similar to the expandable mirror of FIG. 2, the mirror of FIGS. 4 and 5 may have angles between the mirror panes to be less than or substantially equal to 180 degrees, as purposefully set and controlled by a user for his or her specific needs. It is worth noting that, although a maximum of angle α12 and angle α13 may appear in FIG. 5 to be substantially equal to 180 degrees, in some embodiments second pane 20 and third pane 30 may each be configured to swivel further such that each of angle α12 and angle α13 may be greater than 180 degrees. That is, angle α12 formed between first reflective surface 11 and second reflective surface 21, as well as angle α13 formed between first reflective surface 11 and third reflective surface 31, may be less than, substantially equal to or greater than 180 degrees.

For each of the expandable mirrors shown in FIGS. 1-5, the opening or otherwise expanding operation may be reversed to close or otherwise retract the expanded viewing area of the mirror. That is, mechanism 70 may be de-actuated by a user via manual button 60 to perform a closing or retracting action and restore the mirror to a closed position. Moreover, manual button 60 may be used to operate the mirror in opening the mirror (and expanding the viewing area of the mirror) and/or closing the mirror (and retracting the viewing area of the mirror). For example, mechanism 70 may include a spring-loaded hinge, and manual button 60 may connect to a latch (not shown in the figures) configured to latch the mirror panes in closed position 110, 210, 310, 410 or 510. When manual button 60 is pressed, the latch may be unlatched or otherwise released, enabling second pane 20 (and third pane 30) to move into an open position 130, 230, 330, 430 or 530 in reaction to the spring(s) of the hinge(s) of mechanism 70 being unloaded. Alternatively, without using manual button 60, the latch may be unlatched to allow the opening of the mirror when a user manually presses on one or more of mirror panes 20 and 30 in a direction roughly perpendicular to the main surface of visor 50 when the mirror is in closed position 110, 210, 310, 410 or 510. When the mirror is in an open position 130, 230, 330, 430 or 530, a user may subsequently return the mirror manually to the closed position 110, 210, 310, 410 or 510, thereby loading the spring(s) again in preparation for the next opening operation. As another example, mechanism 70 may include a motorized hinge (e.g., with an electrically-powered motor), and a user may control mechanism 70 via manual button 60 to perform the open/close operation. When the expandable mirror is in the closed position, the motorized hinge of mechanism 70 may be configured to open or otherwise expand when manual button 60 is pressed and held, until manual button 60 is released. When the expandable mirror is in a partially open position, the motorized hinge of mechanism 70 may be configured to open or otherwise expand even further when manual button 60 is pressed and held, until manual button 60 is released or until the mirror is fully open as mechanism 70 reaches its movement limit. When the expandable mirror is in a fully open position, the motorized hinge of mechanism 70 may be configured to close or otherwise retract when manual button 60 is pressed and held, until manual button 60 is released or until the mirror is fully closed as mechanism 70 reaches its movement limit.

Figure 6:
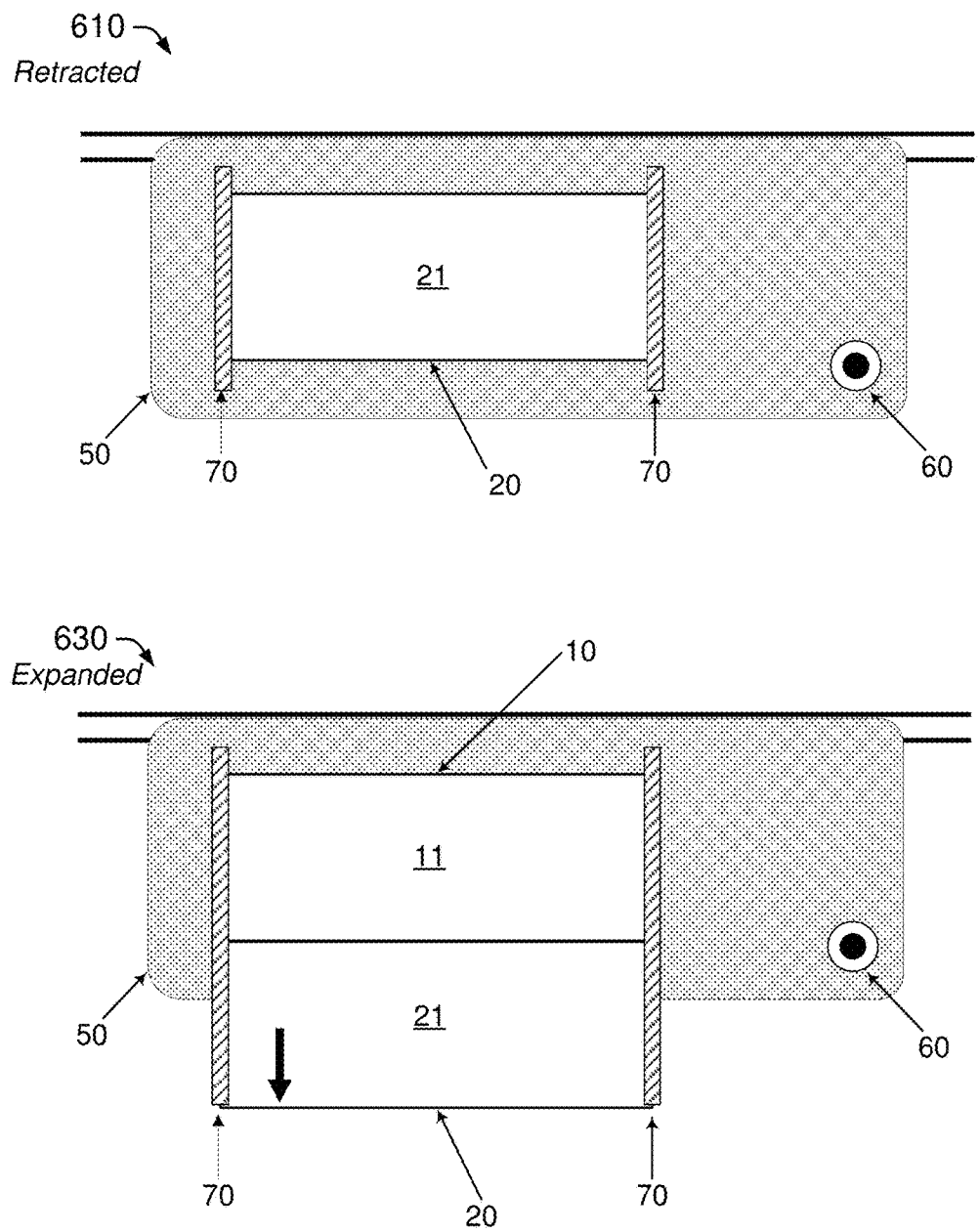
FIG. 6 is a diagram depicting still another example expandable mirror in accordance with an embodiment of the present disclosure.

FIG. 6 illustrates another example expandable mirror that may be implementable in a vehicle. The expandable mirror of FIG. 6 may have certain features similar to those of the expandable mirror of FIG. 1, but with a different kind of mechanism 70. For the expandable mirror of FIG. 6, mechanism 70 may include a pair of telescopic guiding rails that connect first pane 10 and second pane 20 on two opposing sides of panes 10 and 20. When the mirror is in retracted position 610, second pane 20 may be disposed on top of first pane 10, with its reflective surface 21 exposed. Reflective surface 11 of first pane 10, facing in the same direction (e.g., away from visor 50 and toward the inside of the vehicle) as the exposed reflective surface 21 of second pane 20, is hidden behind second pane 20 and thus not exposed. To place the mirror of FIG. 6 in expanded position 630, mechanism 70 may be actuated by a user via manual button 60 such that second pane 20 may slide downwards along mechanism 70 with the two opposing sides engaged in mechanism 70, exposing reflective surface 11 of first pane 10 in addition to reflective surface 21 of second pane 20. Reflective surfaces 11 and 21 thus collectively form the viewing area of the expandable mirror in expanded position 630. That is, the viewing area expands from the size of reflective surface 21 when in retracted position 610 to the aggregate reflective surfaces 11 and 21 when in expanded position 630. As such, the size of the viewing area of the mirror is essentially doubled when expanded, provided that reflective surfaces 11 and 21 have approximately or substantially the same size, although this is not a requirement. It is worth noting that mechanism 70 may be telescopic and may thus be configured to extend when second pane 20 slides away from first pane 10, and to retract when second pane 20 slides toward first pane 10.

Figure 7:
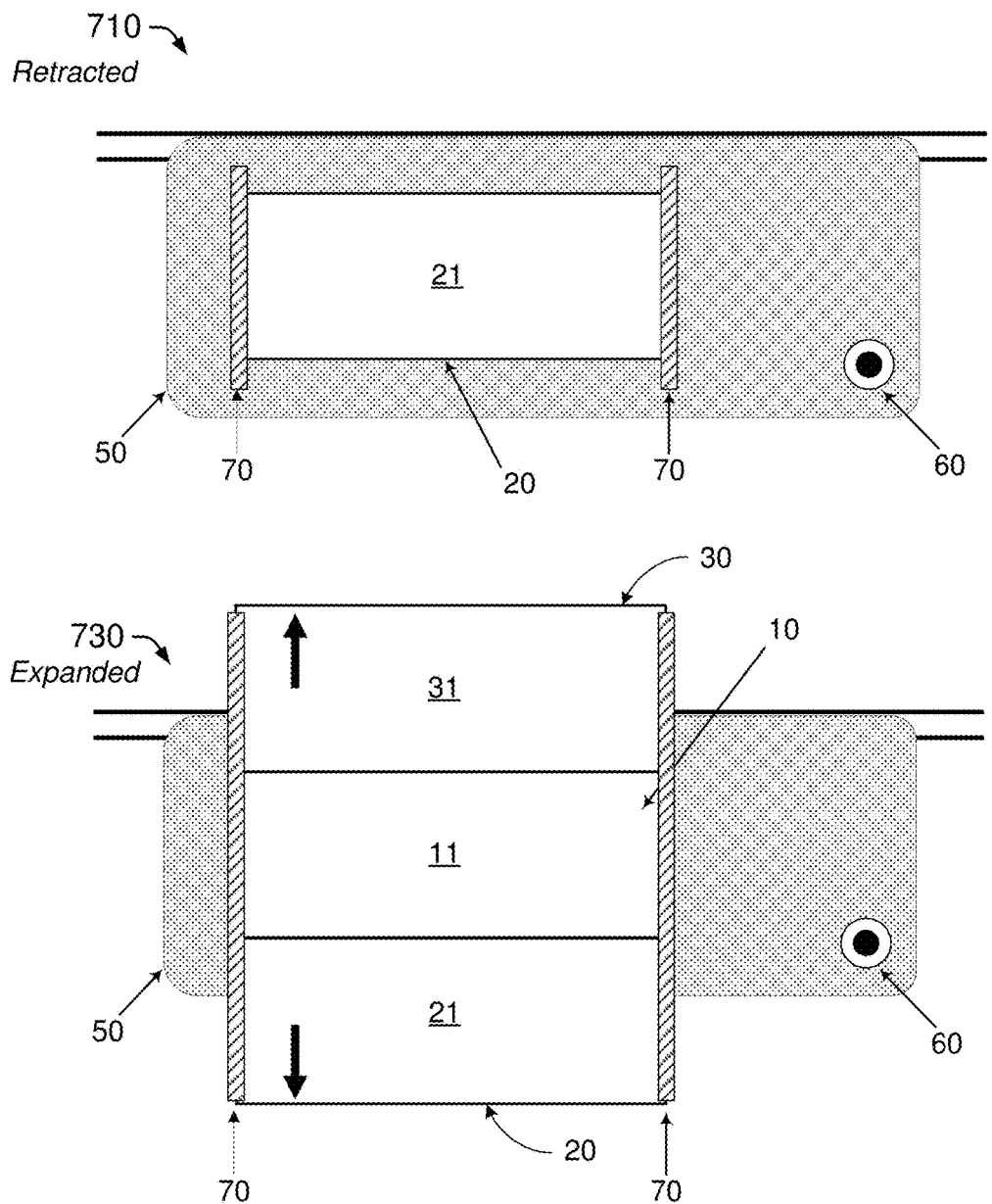
FIG. 7 is a diagram depicting another example expandable mirror in accordance with an embodiment of the present disclosure.
Figure 8:
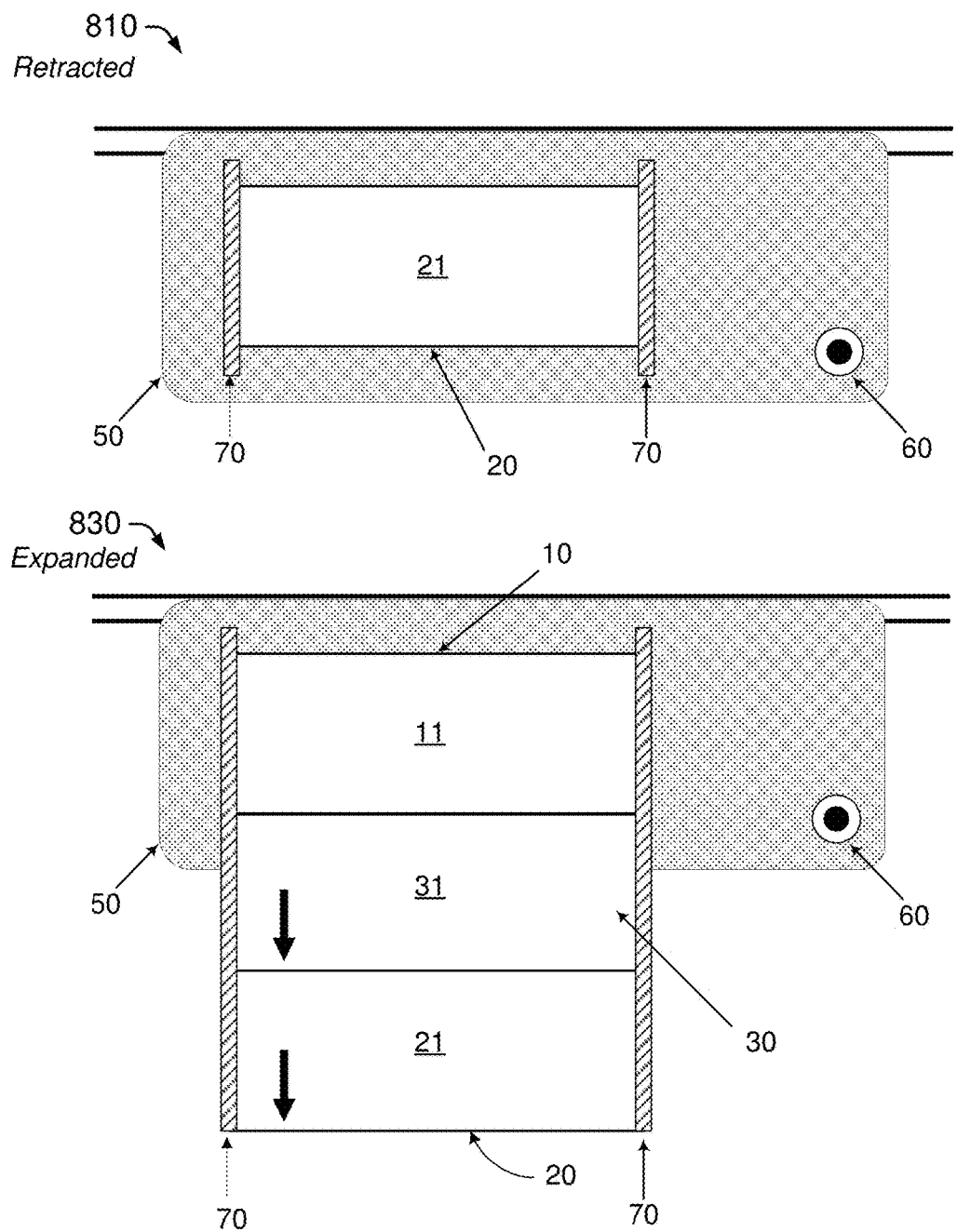
FIG. 8 is a diagram depicting another example expandable mirror in accordance with an embodiment of the present disclosure.
Figure 9:
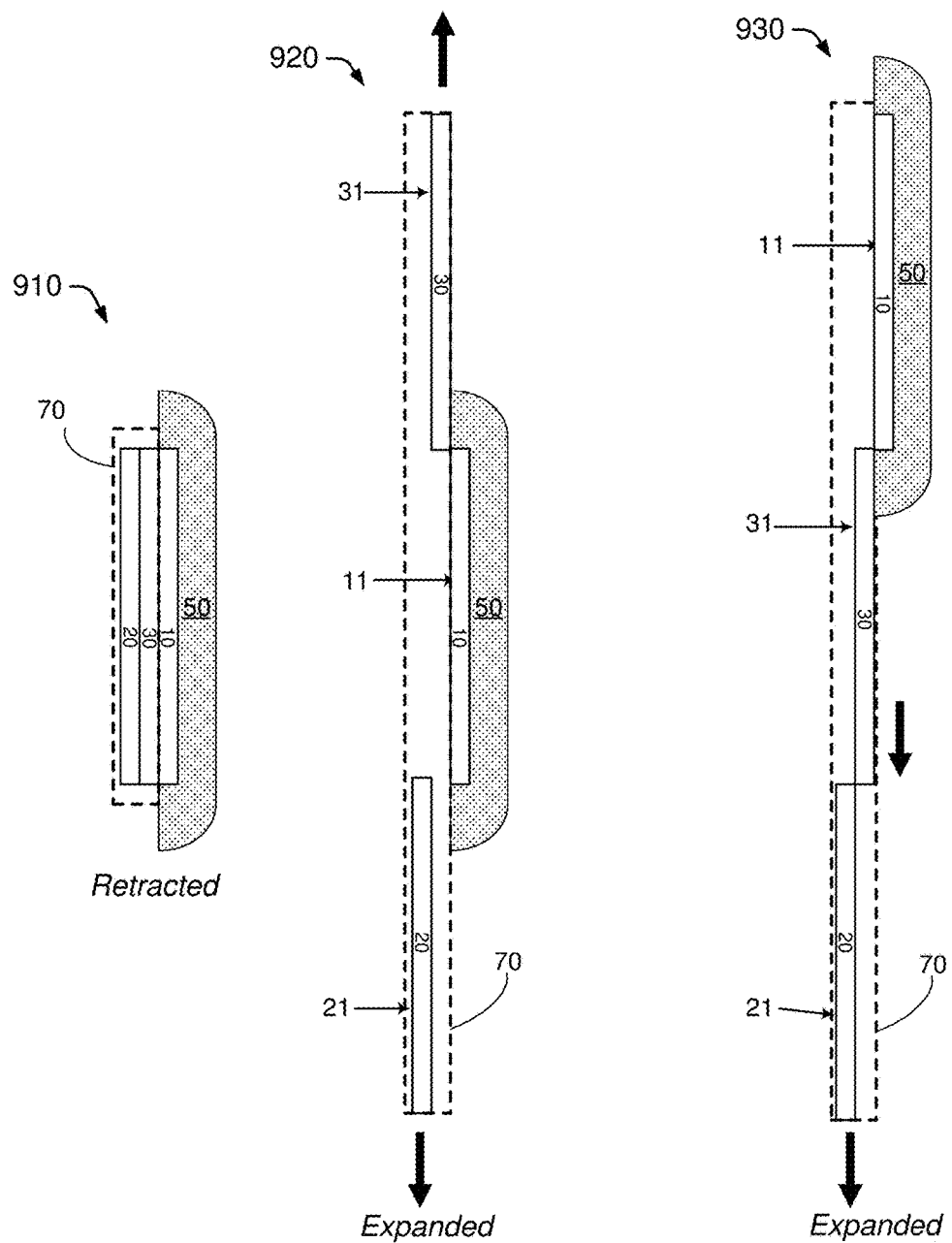
FIG. 9 is a diagram depicting yet another example expanding motion of an expandable mirror in accordance with an embodiment of the present disclosure.

FIGS. 7-9 illustrate yet another example expandable mirror using a similar mechanism 70 as that of the expandable mirror of FIG. 6. The expandable mirror of FIG. 7 may have all the features of the expandable mirror of FIG. 6 except for an additional mirror pane, third pane 30 having reflective surface 31, disposed between first pane 10 and second pane 20 when in retracted position 710, 810 and 910. Each of the reflective surfaces 11, 21, and 31 may be in the same orientation, namely, facing away from visor 50 and toward the inside of the vehicle. In some embodiments, when the mirror is in retracted position 710, 810 and 910, reflective surface 21 may be the only reflective surface exposed that constitutes the viewing area of the mirror, while reflective surfaces 11 and 31 may not be exposed as first pane 10 and third pane 30 are hidden behind second pane 20 and sandwiched between second pane 20 and visor 50. To place the mirror in expanded position 730, 830, 920 or 930, mechanism 70 may be actuated by a user via manual button 60 such that second pane 20 and third pane 30 may slide either upwards or downwards along mechanism 70, with the two opposing sides of each of pane 20 and pane 30 engaged in mechanism 70. Similar to the expandable mirror of FIG. 6, mechanism 70 of FIGS. 7-9 may include telescopic guiding rails and may thus be configured to extend as second pane 20 and third pane 30 slide away from first pane 10, and to retract as second pane 20 and third pane 30 slide toward first pane 10. As shown in expanded position 730 or 920, second pane 20 may be configured to slide downwards and third pane 30 may slide upwards, collectively resulting in a viewing area roughly centered with respect to visor 50. Alternatively, both second pane 20 and third pane 30 may be configured to slide downwards, as shown in expanded position 830 or 930, collectively resulting in a viewing area located at a lower position with respect to visor 50. A user may choose to slide mirror panes 20 and 30 either upwards or downwards, or one way for each, to create a viewing area of the mirror at various heights according to specific needs.

For each of the expandable mirrors shown in FIGS. 6-9, mechanism 70 may include one or more guiding rails that may include a friction guiding rail, a spring-loaded guiding rail, a motorized guiding rail or a combination thereof. The expanding operation of sliding second pane 20 and third pane 30 along the guiding rails may be reversed to reduce the view area of the mirror and restore the mirror panes back to retracted position 710, 810 or 910. That is, mechanism 70 may be de-actuated by a user via manual button 60 to perform a reversed action and restore the mirrors to the retracted position. Similar to embodiments of FIGS. 1-5, expandable mirrors of FIGS. 6-9 may also employ manual button 60 to expand or retract the viewing area of the mirrors. For example, mechanism 70 may include spring-loaded guiding rails, and manual button 60 may connect to one or more latches (not shown in the figures) configured to latch the mirror panes in closed position 610, 710, 810 or 910. When manual button 60 is pressed, the latch(es) may be released or otherwise unlatched, enabling second pane 20 (and third pane 30) to move to an expanded position 630, 730, 830, 920 or 930 in reaction to the spring(s) of the guiding rails being unloaded. Alternatively, without using manual button 60, the latch may be unlatched to allow the expanding of the mirror when a user manually presses on one or more of mirror panes 20 and 30 in a direction parallel to the main surface of visor 50 when the mirror is in closed position 610, 710, 810 or 910. When the mirror is in expanded position 630, 730, 830, 920 or 930, a user may subsequently return the mirror to the retracted position manually, thereby loading the spring(s) again in preparation for the next expanding operation. As another example, mechanism 70 may include motorized guiding rails (e.g., with one or more electrically-powered motors), and a user may control mechanism 70 via manual button 60 to perform the expand/retract operation. When the expandable mirror is in the retracted position, the motorized guiding rails of mechanism 70 may be configured to expand when manual button 60 is pressed and held, until manual button 60 is released or until the mirror is fully expanded. When the expandable mirror is in an expanded position, the motorized guiding rails of mechanism 70 may be configured to retract when manual button 60 is pressed and held, until manual button 60 is released or until the mirror is fully retracted.

Although embodiments of FIGS. 1-5 are described with mechanism 70 having hinges while embodiments of FIGS. 6-9 are described with mechanism 70 having guiding rails, an expandable mirror in accordance with the present disclosure is not limited to one type of mechanism or the other. Instead, an expandable mirror may include both types of mechanisms (e.g., having hinge(s) and guiding rails), and thus be configured to expand/retract or open/close with both types of mechanisms simultaneously.

Figure 10:
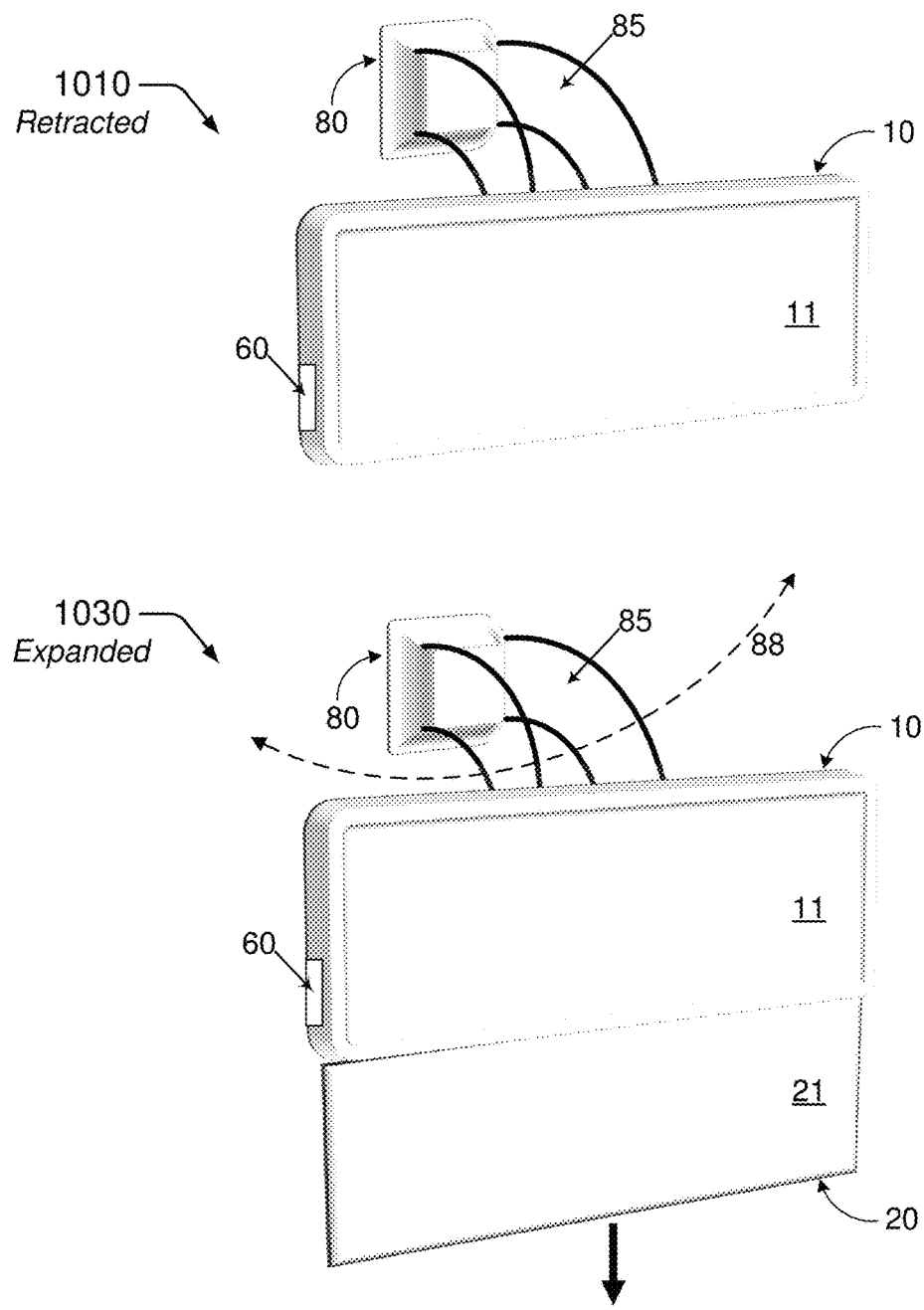
FIG. 10 is a diagram depicting another example expandable mirror in accordance with an embodiment of the present disclosure.

FIG. 10 illustrates yet another embodiment of an expandable mirror. The expandable mirror, though not integrated on visor 50, is similar to the expandable mirror of FIG. 6. A similar mechanism 70, which may be hidden within or otherwise behind first pane 10 (and thus not shown in FIG. 10), may be used to expand and retract second pane 20. When the mirror is in retracted position 1010, second pane 20 may, at least partly, be contained within or otherwise hidden behind first pane 10, and thus not shown in FIG. 10. Namely, reflective surface 11 of first pane 10 may constitute the viewing area of the mirror when it is in retracted position 1010. When the mirror is in expanded position 1030, second pane 20 is unlatched or otherwise released by mechanism 70 (not shown), thereby exposing reflective surface 21 to expand the viewing area of the mirror.

The expandable mirror of FIG. 10 may also include positioning motor 80 as well as flexible arm 85 that connects positioning motor 80 to first and second panes 10 and 20 as a whole. Positioning motor 80 may be configured to tilt, turn or otherwise rotate first and second panes 10 and 20 as a whole toward a user with a motion such as motion 88 of FIG. 10. Consequently, the orientation of the viewing area of the mirror may be adjusted in this way and become more convenient and effective to fulfill specific needs of the user.

The expandable mirror of FIG. 10 may further include manual button 60. Similar to manual button 60 described previously for controlling operations of expandable mirrors of FIGS. 1-9, manual button 60 of FIG. 10 may be configured to control the operation of expandable mirrors of FIGS. 6-10. For example, when manual button 60 is pressed and held, second pane 20 may be configured to move up or down to respectively expand or reduce the size of the viewing area of the mirror.

It is worth noting that, in addition to the described states of "press", "hold" and "release", manual button 60 of FIGS. 1-10 may include other states, such as "open", "close", "expand", "retract", "light on", "light off", "tilt toward driver", "tilt toward passenger", etc., to control the operation of the expandable mirrors of FIGS. 1-10. Alternatively or additionally, expandable mirrors of FIGS. 1-10 may be configured to receive a signal, such as a wireless signal or a voice command from a user, or both, and operate based on the signal received. For example, a user may speak voice commands such as "open", "close", "expand", "retract", "light on", "light off", "tilt toward driver", "tilt toward passenger", etc., and the expandable mirrors of FIGS. 1-10 may react according to the voice commands received.

For each embodiment disclosed in FIGS. 1-9, provided that first pane 10 is fixedly disposed on visor 50, mechanism 70 may alternatively connect second pane 20 and third pane 30 to visor 50, instead of connecting to first pane 10. The principle of opening/expanding and closing/retracting the viewing area of the mirror remain the same as disclosed above. Furthermore, the number of mirror panes is not limited to two or three as exemplified above. More panes can be added in various embodiments to further expand the size of the aggregate viewing area. Since an expandable mirror according the present disclosure is configured to retract or otherwise close with the mirror panes laying on top of each other, the expandable mirror is able to maintain substantially the same form factor at least in the main plane of the mirror when retracted or otherwise closed, with only slight increase in the thickness of the mirror.

Expandable mirrors of FIGS. 1-10 may be implemented at various locations within a cabin of a transportation vehicle, as dictated by the convenience and feasibility of a user using such a mirror. As described earlier, an expanded mirror may be integrated with a sun visor located above and slightly in front of the driver seat or a front passenger seat of an automobile, preferably on the inner side of the sun visor. Alternatively or additionally, an expanded mirror may be mounted on the ceiling of the cabin of the transportation vehicle, or on the backside of a headrest of a seat in the transportation vehicle.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A vehicle, comprising:
    an automobile comprising a cabin configured to fit at least a user; and
    an expandable mirror disposed in the cabin, the expandable mirror comprising:
        a first pane having a first reflective surface;
        a second pane having a second reflective surface;
        a third pane having a third reflective surface,
        a mechanism connected with each of the first pane and the second pane, wherein the mechanism is configured, when actuated, to expand a viewing area of the mirror from a first size to a second size larger than the first size, the expanded viewing area comprising the first and second reflective surfaces; and
        a positioning motor configured to integrally position the first pane and the second pane as a whole for adjusting an orientation of the viewing area of the mirror with respect to the user,
        wherein the mechanism comprises a plurality of guiding rails connecting the first, second and third panes, and wherein the mechanism is configured to expand the viewing area of the mirror by sliding the second and third panes along the plurality of guiding rails to expose each of the first, second and third reflective surfaces such that the viewing area of the mirror comprises the first, second and third reflective surfaces.

2. The vehicle of claim 1, wherein the automobile further comprises a visor mounted in the cabin, and wherein the expandable mirror is disposed on an inner side of the visor.

3. The vehicle of claim 1, wherein the expandable mirror is disposed on a ceiling of the cabin.

4. The vehicle of claim 1, wherein the automobile further comprises a seat mounted in the cabin, and wherein the expandable mirror is disposed on a backside of a headrest of the seat.

5. A mirror implementable in a vehicle, comprising:
    a first pane having a first reflective surface;
    a second pane having a second reflective surface;
    a third pane having a third reflective surface,
    a mechanism connected with each of the first and second panes, wherein the mechanism is configured, when actuated, to expand a viewing area of the mirror from a first size to a second size larger than the first size, the expanded viewing area comprising the first and second reflective surfaces; and
    a positioning motor configured to integrally position the first pane and the second pane as a whole for adjusting an orientation of the viewing area of the mirror,
    wherein the mechanism comprises a plurality of guiding rails connecting the first, second and third panes, and wherein the mechanism is configured to expand the viewing area of the mirror by sliding the second and third panes along the plurality of guiding rails to expose each of the first, second and third reflective surfaces such that the viewing area of the mirror comprises the first, second and third reflective surfaces.

6. The mirror of claim 5, wherein the plurality of guiding rails comprise friction guiding rails, spring-loaded guiding rails, motorized guiding rails or a combination thereof.

7. The mirror of claim 5, wherein an angle formed between the first and second reflective surfaces when the viewing area is expanded is less than, substantially equal to or greater than 180 degrees.

8. The mirror of claim 5, wherein the mechanism is further configured, when de-actuated, to restore the viewing area of the mirror from the second size to the first size.

9. The mirror of claim 5, wherein at least one of the first pane and the second pane comprises one or more lighting fixtures, the one or more lighting fixtures configured to turn on when the mechanism is actuated to expand the viewing area of the mirror to the second size, the one or more lighting fixtures configured to turn off when the mechanism is de-actuated to restore the viewing area to the first size.

10. The mirror of claim 5, wherein the mirror further comprises a manual button configured to actuate or de-actuate the mechanism when pressed.

11. The mirror of claim 10, wherein the second pane is configured to move continually while the manual button is pressed and held, and wherein the second pane is configured to stop moving when the manual button is released.

12. The mirror of claim 5, wherein the mirror is configured to receive a signal, and wherein the mirror is further configured to actuate and de-actuate the mechanism in response to receiving the signal.

13. The mirror of claim 12, wherein the signal comprises a wireless signal or a voice command.

14. The mirror of claim 5, wherein each of the first and second reflective surfaces comprises a standard glass, an anti-glare glass, or a layer of reflective coating.

15. The mirror of claim 5, further comprising:
    a flexible arm connecting the positioning motor to the first and second panes as a whole,
    wherein the positioning motor is configured to tilt, turn or rotate the first and second panes as a whole with a motion of the flexible arm.

\* \* \* \* \*